UNITED STATES PATENT OFFICE.

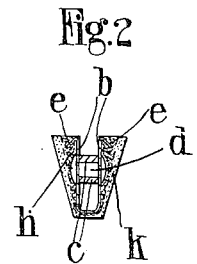
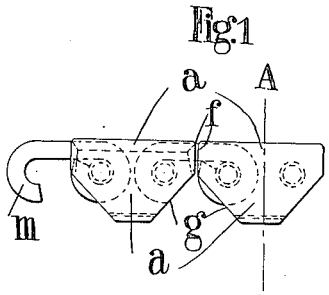
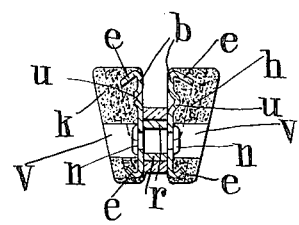
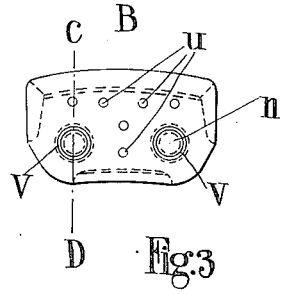
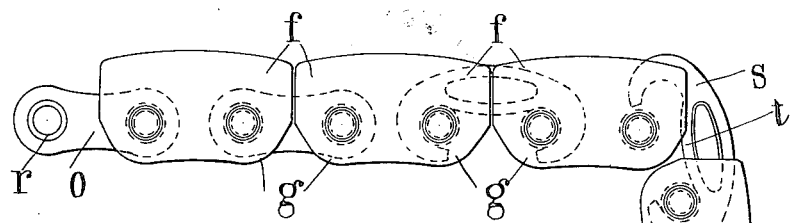
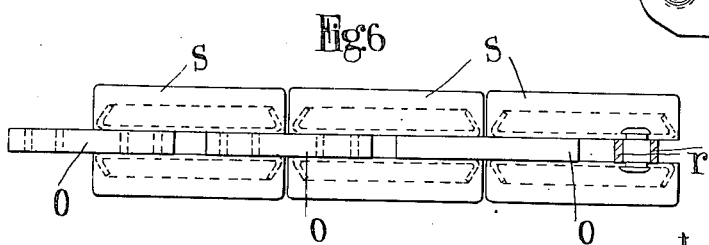
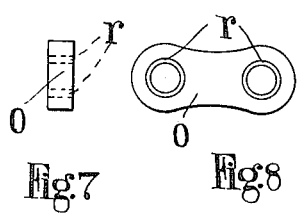
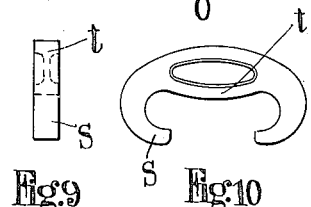

JOHN HOWARD SMITH, OF LONDON, ENGLAND, ROBERT HARVEY BRAND, OF ASCOT, ENGLAND, AND THOMAS GEOFFREY LEITH, OF OYNE, SCOTLAND.

DRIVING BELT OR CHAIN.

1,407,598.  Specification of Letters Patent.  Patented Feb. 21, 1922.

Application filed June 16, 1920. Serial No. 389,426.

*To all whom it may concern:*

Be it known that we, JOHN HOWARD SMITH, a subject of the King of Great Britain and Ireland, and residing at 15 King Street, Baker Street, London, W. 1, England, ROBERT HARVEY BRAND, a subject of the King of Great Britain and Ireland, and residing at Cranbourne Corner, Ascot, in the county of Berks, England, and THOMAS GEOFFREY LEITH, a subject of the King of Great Britain and Ireland, and residing at Petmathen House, Oyne, in the county of Aberdeen, Scotland, have invented certain new and useful Improvements in and Relating to Driving Belts or Chains, of which the following is a specification.

This invention relates to driving belts or chains formed of pivotally connected links, to which rubber, leather or other driving surfaces are attached.

The main object of the present invention is to improve the method of manufacture and details of construction of the individual driving links with a view to reducing their cost of production and increasing their efficiency.

In belts or chains of the type to which this invention relates, having driving links formed of metal side plates formed from one or more blanks, the quality of rubber best adapted for vulcanizing to the side plates is not the quality best adapted for the actual driving surface.

Hence an important feature of the present invention consists in using two different grades of rubber, each adapted to the particular duty it is called on to perform.

Another important feature of the present invention aims at securing as large a driving surface as possible by making the outside corners square so that they butt against one another when the belt or chain is straight and cutting away the inside corners, i. e., the corners inside a line joining the centres of the pivot pins. If a two-hole link of the usual shape is used, such as is hereinafter described, the corners are cut away only so much as will allow the belt to bend round the smaller pulley, but if detachable hooked connecting links are used, the corners are cut away further to allow of the additional bending for connecting or disconnecting the links.

Other important features of the present invention relate to the particular formations of the side plates whereby additional adhesive surface is provided for the rubber or like preparation vulcanized to them.

Referring to the accompanying drawings which illustrate one form of the invention:—

Figure 1 shows a side elevation of two driving links, each having its metal side plates formed from a single blank, assembled with their connecting links, Figure 2 showing a cross-sectional view through one of the driving links on the line A—B of Figure 1.

Figure 3 shows a side view of another form of link in which the side plates are formed of separate blanks, Figure 4 being a cross-section on the line C—D of Figure 3.

Figure 5 is a side view of a few links assembled and in addition shows how an individual driving link may be attached or detached when a hooked connecting link is used;

Figure 6 shows a plan of the assembled links in Figure 5.

Figures 7 and 8 show end and side views of an ordinary two-hole connecting link, while finally Figures 9 and 10 show similar views of a special form of double-hook connecting link.

In carrying the invention into effect according to the form shown in Figures 1 and 2, the driving link, $a$, comprises side plates, $b$, formed of a single sheet metal blank preferably of steel bent into a U-form, and held at the right distance apart by a hardened steel bush or roller, $c$, through which passes a pivot pin, $d$, riveted over at both ends as indicated. Or a shouldered rivet might be used with or without the hardened steel bush. In addition the outer edges of the side plates and the end edges are bent outwards as at $e$, so as to form an angle of about 45° with the side plates themselves and thereby provide additional adhesive surface for the rubber in which they are embedded. The driving link itself, with a view to obtaining a maximum driving surface, is preferably formed of such a contour as seen in side view (see Figure 2) that the edges, $f$, of adjacent links when in line with one another butt over a distance extending from the outside of the link to a point about in line with the line of centres of the pivot pins, while within this line the corners, $g$, of the links are cut away at an angle of about 45°, as shown in Figure 1, to allow the driving links to turn in relation to one another when passing round the pulleys and also to allow the belt to be bent sufficiently to detach an individual driving link by unhooking it from its neighbour; this shape of link also prevents the belt or chain bending backwards beyond the straight and tends to prevent sag of the driving length of belt between the pulleys.

The metal structure above described is completed by vulcanizing to it in a manner to be explained more in detail hereinafter, two different qualities of rubber, a lower or harder grade, $h$, vulcanized directly to the steel plates and a higher or softer grade, $k$, to form the actual driving surface, the whole being given the usual wedge shaped form as seen in Figure 2.

A link so constructed or any other link of the same general type in which two different grades of rubber are used as described, forms an interchangeable unit, any suitable form whatever of connecting link being employed in conjunction therewith, but the form of connecting link preferred for this purpose is known as a Stanley link (see $m$, Figure 1) and consists of a length of hardened steel wire square in cross-section bent round at one end into a circle to enclose the pivot pin and at the other end into a hook. Such a combination of driving link with its attached connecting link forms a unit or component which can be readily interchanged with any similar such unit in the driving belt.

The preferred manner of manufacturing a link as above described is as follows:—

The side plates, $b$, are first formed with turned over edges, $e$, from a single sheet metal blank bent into a U-form and provided with holes properly disposed to receive the pivot pins. These pins are then inserted through the holes and also through a hardened steel bush, $c$, or Stanley link, $m$, if such parts are used and the ends riveted over, thereby completing the metal work of the driving link.

A suitably shaped blank of lower grade or harder rubber, $h$, is then passed completely round the outside of the U, shaped so as to surround it on all three sides, and outside this lower grade of rubber is arranged a similar blank of higher or softer grade rubber, $k$, to form the actual driving surface and the parts so assembled are then vulcanized in a mould in the ordinary manner.

According to this method it will be seen that the lower grade rubber is vulcanized not only to the outer sides of the U, but also to the riveted over heads of the pivot pin and in this particular form of link, no necessity therefore arises for leaving holes in the rubber in order that the pivot pins may be subsequently inserted.

According to a modification shown in Figures 3 to 10, the side plates, $b$, are formed of separate blanks with turned over edges, $e$, as before. In the example shown, a shouldered rivet, $n$, keeps the plates the proper distance apart, while (see Figure 5) in side view, the links having butting portions, $f$, and cut-away corners $g$. A two-hole solid link, $o$, (see Figures 7 and 8) provided preferably with a hardened steel bush, $r$, may be used as the connecting link or preferably a form of hook link which can be attached or detached by bending the chain as a whole through a right angle as indicated in the right-hand portion of Figure 5. A suitable link, $s$, for the purpose is shown in Figures 9 and 10, the centre portion, $t$, being of extra depth for strength.

As before two qualities of rubber, $h$ and $k$, are used while in addition to or in place of the bent-over edges, $e$, a series of projections, $u$, may be formed to give additional adhesive surface to the rubber.

In this modification, the rubber is preferably vulcanized to the side plates before the latter are assembled, small holes, $v$, being left in the rubber to facilitate access to the rivets.

Belts or chains constructed as above described are at the same time mechanically strong on account of the metal side plates, the rubber is well secured to the side plates on account of the grade of rubber adjacent thereto, and the ample adhesive area, provided by the turned-over edges, the driving surface is a maximum and of a grade of rubber best adapted to give a good grip and stand wear, while finally where hooked connecting links are used any individual link can be readily removed if damaged and a new one inserted.

Having now described our invention, what we claim as new and desire to secure by Letters Patent is:—

1. A driving link for a driving belt of the kind indicated comprising in combination, a metal frame, a lower or harder grade of rubber vulcanized directly thereto and a higher or softer grade of rubber vulcanized to said lower or harder grade, as set forth.

2. A form of connecting link for a driving belt of the type indicated consisting of a double hook having a maximum depth at its centre of girder section, as set forth.

3. A driving belt comprising in combination a series of driving links closely spaced longitudinally to provide a maximum driving surface, said links comprising side members spaced apart and pins securing said side members together; together with hooked links co-acting with said pins to connect said driving links together and disposed between said side members, said driving links being cut away on their inside corners sufficiently to allow the belt to be bent inwards to connect or disconnect said hooked links, as set forth.

4. A driving link for a driving belt of the kind indicated comprising in combination, a sheet-metal frame having turned-over edge portions and driving pads vulcanized to said frame, said edge portions being wholly embedded in said driving pads, as set forth.

5. A driving link for a driving belt of the kind indicated comprising in combination, a metal frame and driving pads vulcanized thereto, said metal frame being provided with a plurality of projections such as $u$ to provide additional points of adherence for said pads, as set forth.

In testimony whereof we have signed our names to this specification.

JOHN HOWARD SMITH.
ROBERT HARVEY BRAND.
THOMAS GEOFFREY LEITH.